United States Patent
Hilburger et al.

[11] Patent Number: 6,109,598
[45] Date of Patent: Aug. 29, 2000

[54] AIR SPRING BUMPER UTILIZING A COMBINATION OF MATERIALS

[75] Inventors: Mark D. Hilburger, Carmel; Terry J. Henderson, South Bend; Mohamad Taghizadeh, Indianapolis; Andreas Peickert, South Bend; Daniel J. Leonard, Carmel, all of Ind.; James M. Wallin, Bowling Green, Ky.; Todd M. Ziems, Granger, Ind.

[73] Assignee: Bridgestone/Firestone, Inc., Akron, Ohio

[21] Appl. No.: 09/342,943

[22] Filed: Jun. 29, 1999

[51] Int. Cl.[7] .................................................. F16F 9/04
[52] U.S. Cl. ................................... 267/64.24; 267/64.27; 411/171
[58] Field of Search ................................. 267/35, 64.21, 267/64.23, 64.24, 64.27, 122, 140, 152, 153, 292; 280/124.158, 124.159, 124.16, 124.161; 411/171

[56] References Cited

U.S. PATENT DOCUMENTS

| | | | |
|---|---|---|---|
| 3,658,314 | 4/1972 | Luzsicza | 267/121 |
| 4,132,395 | 1/1979 | Fox, Jr. | 267/64 R |
| 4,342,264 | 8/1982 | Hindin et al. | 105/215 |
| 4,412,965 | 11/1983 | Thompson et al. | 264/257 |
| 4,427,189 | 1/1984 | Kimura et al. | 267/139 |
| 4,673,314 | 6/1987 | Hara et al. | 405/215 |
| 4,787,608 | 11/1988 | Elliott | 267/64.27 |
| 4,911,416 | 3/1990 | Warmuth, II | 267/64.24 |
| 5,201,500 | 4/1993 | Ecktman et al. | 267/140 |
| 5,257,730 | 11/1993 | Nakaura | 267/220 |
| 5,535,994 | 7/1996 | Safreed, Jr. | 267/64.27 |
| 5,678,809 | 10/1997 | Nakagawa et al. | 267/148 |
| 5,868,384 | 2/1999 | Anderson | 267/141.1 |
| 5,921,532 | 7/1999 | Pierce et al. | 267/64.19 |
| 5,934,652 | 8/1999 | Hofacre et al. | 267/64.27 |
| 5,941,510 | 8/1999 | Grass et al. | 267/64.27 |

Primary Examiner—Christopher P. Schwartz
Assistant Examiner—Pamela J. Lipka
Attorney, Agent, or Firm—John M. Vasuta; Michael Sand

[57] ABSTRACT

An air spring has a pair of spaced end members for mounting the spring at spaced locations on a structure. A flexible sleeve of elastomeric material is sealingly engaged with the end members and forms a pressurized fluid chamber therebetween. A post is mounted on one of the end members and extends into the fluid chamber. A shock absorbing bumper having an outer shell formed of a high strength first plastic material is mounted on the post. The shock absorbing bumper shell is formed with a plurality of internal compartments containing one or more blocks formed of a second plastic material. The second plastic material preferably is a thermoplastic and is stronger in compression than the first plastic material of the outer shell. The relatively stronger but stiffer blocks are surrounded by the relatively softer plastic material of the outer shell and provides a bumper having extremely high compressive strength and a high resistance to breakage or fracture.

28 Claims, 2 Drawing Sheets

6,109,598

AIR SPRING BUMPER UTILIZING A COMBINATION OF MATERIALS

BACKGROUND OF THE INVENTION

1. Technical Field

The invention relates generally to air springs and, in particular, to air springs having an internal bumper which acts as a back-up in case of air spring failure or to absorb sudden large deflections or shocks imparted on the air springs. Specifically, the invention relates to a block of an elastomeric material, such as a thermoplastic, that can be installed into the compartments of a bumper in various numbers and configurations to control the compressive elastic characteristics of the bumper.

2. Background Information

Pneumatic springs, commonly referred to as air springs, have been used for motor vehicles and various machines and other equipment for a number of years to provide cushioning between movable parts, primarily, to absorb shock loads and vibration damping imparted thereon. The air spring usually consists of a flexible rubber sleeve which extends between a pair of end members and which contains a supply of compressed air and may have one or more pistons located at ends of the flexible sleeve. The end members mount the air spring on spaced components or parts of the vehicle or equipment on which the air spring is mounted.

The internal pressurized fluid, which is generally air, absorbs most of the shock impressed upon or experienced by one of the spaced end members on which the air spring is mounted, with the ends members moving axially toward and away from each other upon absorbing the imparted shock. Examples of such air springs are shown in U.S. Pat. Nos. 4,787,606, 4,852,861, 4,946,144 and 5,201,500.

Certain of these prior art air springs have internal bumpers mounted on one of the end members which extends into the interior of the pressurized chamber. The bumper prevents total collapse or deflection of the air spring member in the event of air spring failure. The bumper also absorbs shock whenever the spring experiences severe shocks and deflections which result in actual or near "bottoming out" of the air spring member.

While these prior art bumpers are satisfactory for most applications, such bumpers still have a number of shortcomings related to their use. Particularly, the use of such bumpers has not been well suited to applications wherein the bumper is expected to experience a high number at a fast rate of extreme shocks inasmuch as such extreme shocks have resulted in complete deflection of the bumper without sufficient isolation of the extreme shocks from the structures mounted on the air spring.

Another problem that occurs in the use of air springs is that when a vehicle such as a truck is at rest, the air is released from within the air spring and the internal bumper supports the weight without any fluid pressure assistance. Occasionally, the driver will then start and drive the vehicle before the air spring is fully inflated and severe shock can be impressed upon the partially inflated bumper causing severe damage thereto.

Most prior art air springs are formed of a single elastomeric material which provides a compromise in order to absorb most of the shocks which are exerted thereon yet which is sufficiently pliable to prevent permanent damage or breaking of the bumper should a severe shock be applied thereto.

A need thus exists for an improved air spring bumper that can withstand the extreme shocks that are experienced in certain applications and which can have multiple configurations suited to different loading applications.

Examples of other devices including shock-absorbing components are set forth in the following patents.

U.S. Pat. No. 3,658,314 discloses a fluid shock absorber having an elastomeric member mounted between two concentrically movable tubes with an elastomeric bumper mounted beneath the inner tube to absorb impact from the tube.

U.S. Pat. No. 4,218,599 discloses a polymer spring for use in a drawer of a cabinet to ensure that when the drawer is closed, it does not rebound to a partially open position.

U.S. Pat. No. 4,342,264 shows another type of air spring using an elastomeric bumper mounted on one of the end members.

U.S. Pat. No. 4,478,396 discloses an elastomeric bumper which is mounted on the top of a vehicle strut.

U.S. Pat. No. 4,506,910 discloses a bumper mounted on the inner surface of a mounting plate of the air spring, whereby the bumper provides a limit to any extreme swinging of the beam attached to the piston opposed to the mounting plate.

U.S. Pat. No. 4,787,606 shows a rubber bumper attached to the inner surface of one of the end plates by a pin where the rubber bumper serves to prevent total collapse or deflection of the spring assembly.

U.S. Pat. No. 4,925,224 discloses an energy-absorbing bumper with an elastomeric bumper module. The energy-absorbing bumper is attachable to a vehicle where it serves to absorb the energy of an impact of that vehicle with another object.

U.S. Pat. No. 5,201,500 shows an air spring in which a post is mounted on one of the end members and extends into the fluid chamber where a shock-absorbing bumper is formed and snap-fitted on the enlarged top of the post.

However, no known device, including those discussed above, disclose an air spring having an internal bumper that receives one or more elastomeric blocks of material into cavities formed in the bumper to allow the bumper to withstand extreme shock loading, the bumper having a number of different configurations suited to different loading applications.

SUMMARY OF THE INVENTION

An objective of the invention includes providing an improved air spring construction for motor vehicles and other types of equipment having spaced movable end members separated by a pressurized chamber extending between the end members for absorbing excessive shock imparted on the end members.

A further objective of the invention is to provide such an improved air spring in which a plastic bumper is mounted within the pressurized chamber.

Another objective of the invention is to provide such an improved air spring in which the shock-absorbing bumper is formed of a high-strength plastic material and one or more blocks of an elastomeric material, such as a thermoplastic, to absorb sudden large deflections and to act as a back-up device in case of air spring failure.

Still another objective of the invention is to provide such an improved air spring in which the shock-absorbing bumper can have several configurations depending upon the number and positioning of elastomeric blocks received therein.

A further objective of the invention is to provide an improved air spring that surrounds a relatively harder, stiffer block with a relatively softer outer shell material to provide a composite that provides the strength and stiffness while reducing the likelihood that the internal block might break or otherwise fracture during use.

Another objective of the invention is to provide an improved air spring having a shock-absorbing bumper that utilizes a strong, relatively stiff block to withstand extreme shock loading and that obviates the risk that the relatively stiff block will break or otherwise fracture during use.

A further objective of the invention is to provide such an improved air spring which provides both increased vertical and lateral load capability.

A further objective of the invention is to provide such an improved air spring bumper which provides increased life in terms of cycles and impact loading.

Another objective of the invention is to provide such an improved air spring which is light in weight, easy to assemble, which can carry greater loads than the heretofore-used softer elastomeric bumpers, and which has overall bumper height flexibility.

These objectives and advantages are obtained by the improved air spring construction of the invention, the general nature of which may be stated as being an air spring of the type having a pair of spaced end members adapted to be mounted at spaced locations and a flexible sleeve formed of an elastomeric material sealingly engaged with the end members and forming a pressurized fluid chamber therebetween, a shock-absorbing bumper mounted on one of the end member and extending into the fluid chamber for possible impact engagement with the other said end members, said bumper being formed of an outer shell of a first plastic material and having at least one inner member formed of a second plastic material mounted within said outer shell, wherein said second plastic material is stronger in compression than said first plastic material.

BRIEF DESCRIPTION OF THE DRAWINGS

The preferred embodiment of the invention, illustrative of the best mode in which applicants have contemplated applying the principles of the invention, is set forth in the following description and is shown in the drawings and is particularly and distinctly pointed out and set forth in the appended Claims.

Similar numerals refer to similar parts throughout the drawings.

DESCRIPTION OF THE PREFERRED EMBODIMENT

Figure 1:
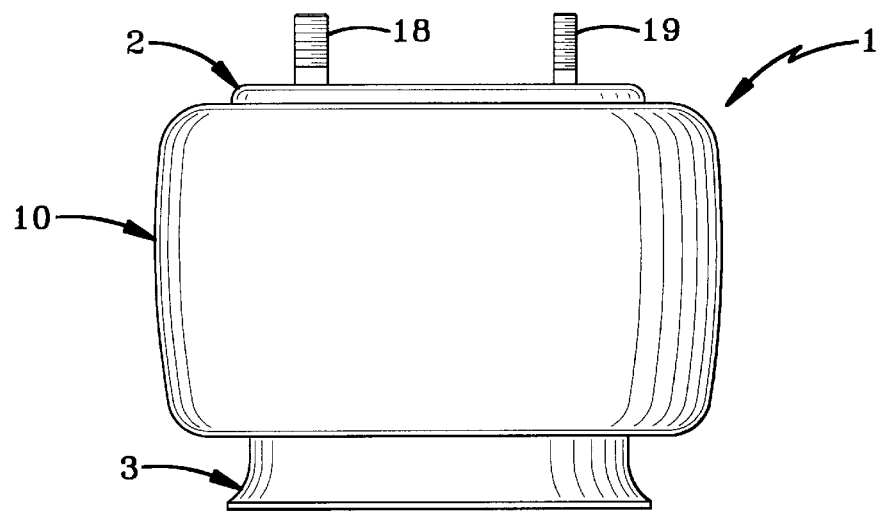
FIG. 1 is an elevational view of an air spring in which the improved bumper of the present invention is utilized.
Figure 2:
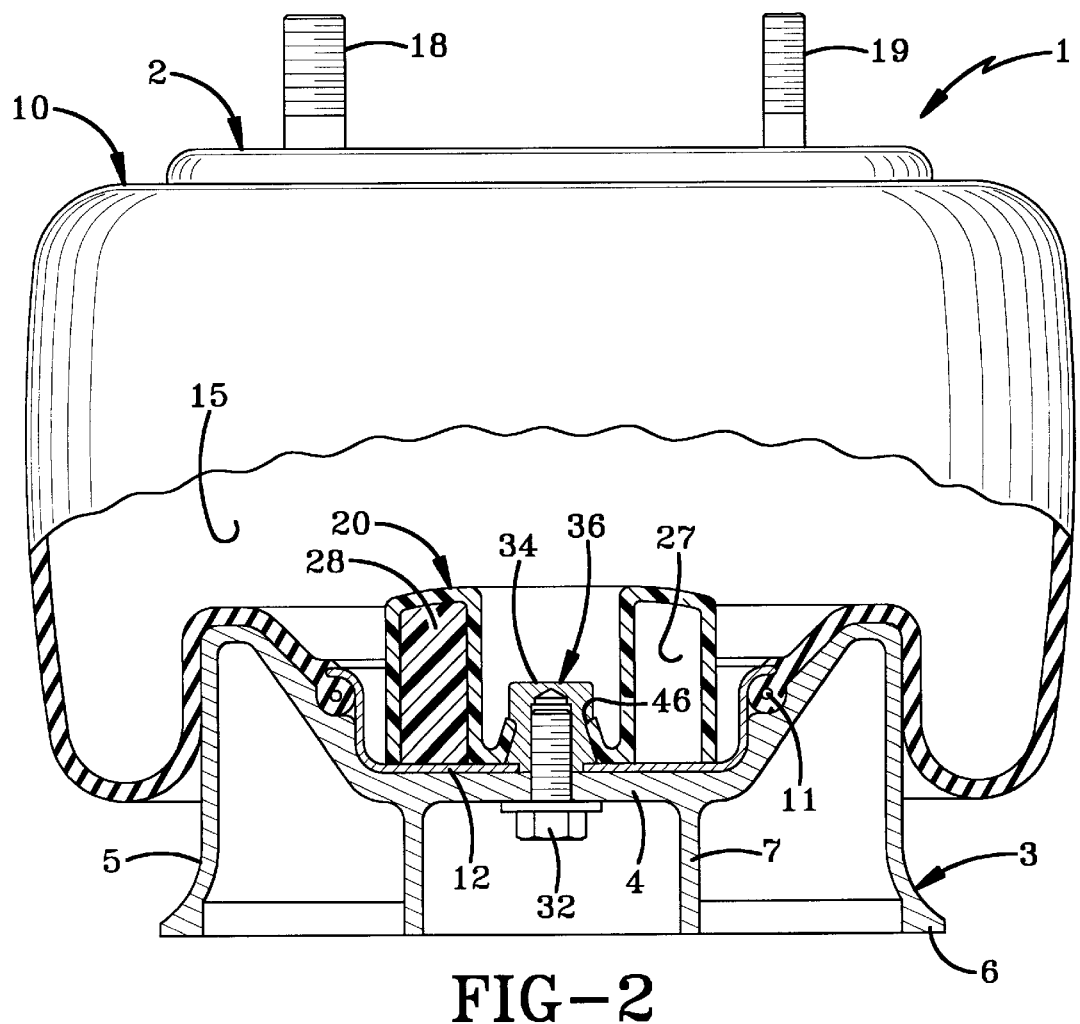
FIG. 2 is an enlarged view with portions broken away and in section, of the air spring shown in FIG. 1.

The improved air spring of the invention is indicated generally at 1, and is shown in an unmounted, at-rest position in FIGS. 1 and 2. Air spring 1 includes an upper end cap member and an opposed axially spaced piston member, indicated generally at 2 and 3, respectively (FIGS. 1 and 2). Piston 3 is of a usual construction, preferably having an inverted generally bowl-shaped configuration formed of a suitable material such as aluminum, steel, high strength plastic or the like. Piston 3 includes a base 4 and an annular wall 5 extending downwardly from base 4 and terminating in a peripheral edge 6. A central supporting structure 7 is joined with and extends downwardly from base 4.

One end of a flexible sleeve which is indicated generally at 10, terminates in a lower bead 11 which is clamped on base 4 of piston 3 by a clamping plate 12 in an airtight sealing relationship with piston 3. The other end of sleeve 10 has an end bead (not shown) which is secured in a curled marginal edge (not shown) of mounting end cap 2 in an airtight sealing relationship therewith, providing a fluid tight chamber 15 within elastomeric sleeve 10. Other types of end sealing arrangements may be utilized without effecting the concept of the invention, such as shown in U.S. Pat. Nos. 4,852,861, 4,787,606 and 4,946,144, which are assigned to the same entity as is the present invention, and which do not require a beaded end seal.

A source of pressurized air or other fluid communicates with an internal fluid chamber 15 formed within sleeve 10 through a hollow bore (not shown) of a mounting stud 18 extending outwardly from end plate 2. One or more additional mounting studs 19 are mounted on end cap 2 and extend upwardly therefrom for mounting air spring 1 on a vehicle, machine tool or other application in which it is to be used.

The particular air spring construction described above and shown in the drawings and particularly in FIGS. 1 and 2 may vary without affecting the concept of the invention.

Figure 3:
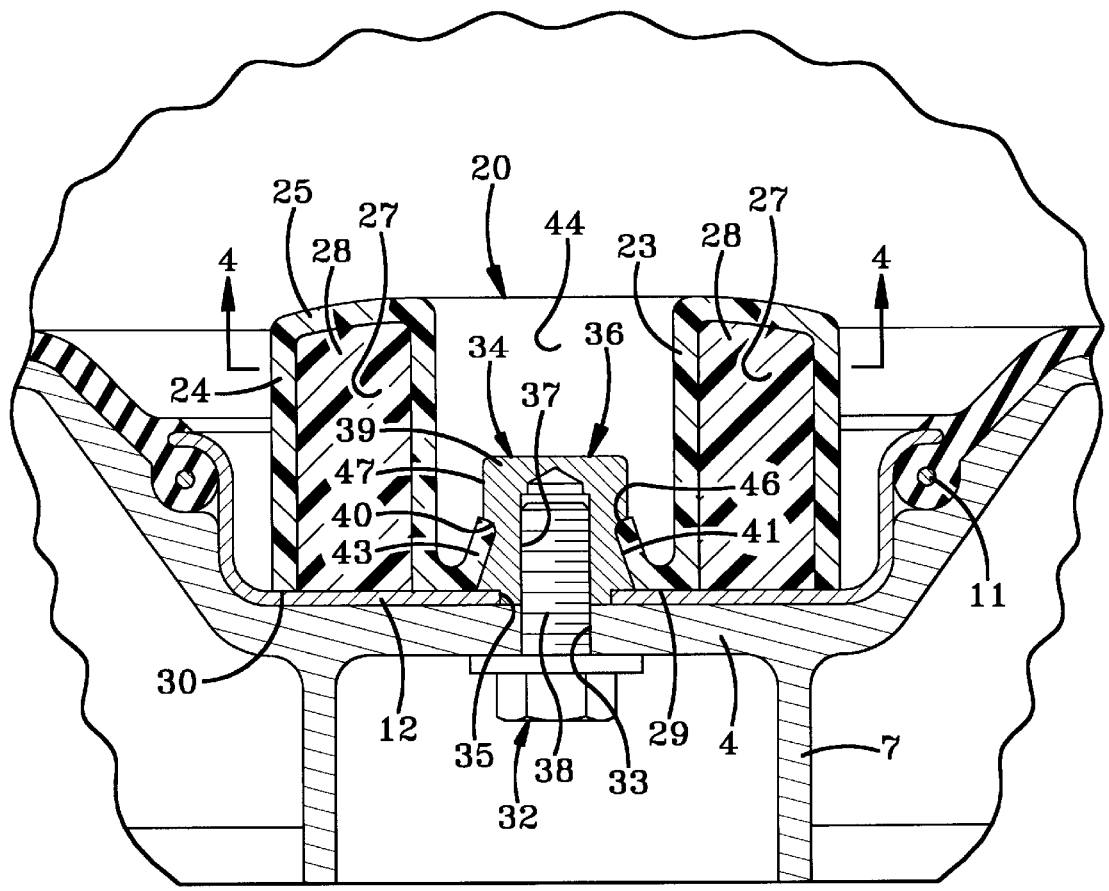
FIG. 3 is a further enlarged fragmentary sectional view of the improved bumper mounted within the air spring.

A snap-on bumper, indicated generally at 20 (FIG. 3), is mounted on clamp plate 12 of base 4 and extends upwardly therefrom into chamber 15. Bumper 20 engages end cap 2 upon the loss of the pressurized fluid within chamber 15 and assists in absorbing excessive shock forces exerted on end member 2 or piston 3. Bumper 20 is similar to the bumper shown and described in U.S. Pat. No. 5,201,500, the contents of which are incorporated herein by reference.

Bumper 20 includes inner and outer generally cylindrical walls 23 and 24, respectively, concentrically arranged with each other and which both terminate in an integral dome-shaped connecting top wall 25. A plurality of radially extending reinforcing ribs 26 are formed integrally with inner and outer walls 23 and 24 and extend therebetween to provide a rigid integrally formed one-piece bumper member. Reinforcing ribs 26 define a plurality of compartments 27 between inner and outer walls 23 and 24. Inner wall 23 terminates in an annular base 29 which lies in the same plane as does the annular peripheral edge 30 of outer wall 24 as shown particularly in FIG. 3.

Figures 4, 5:
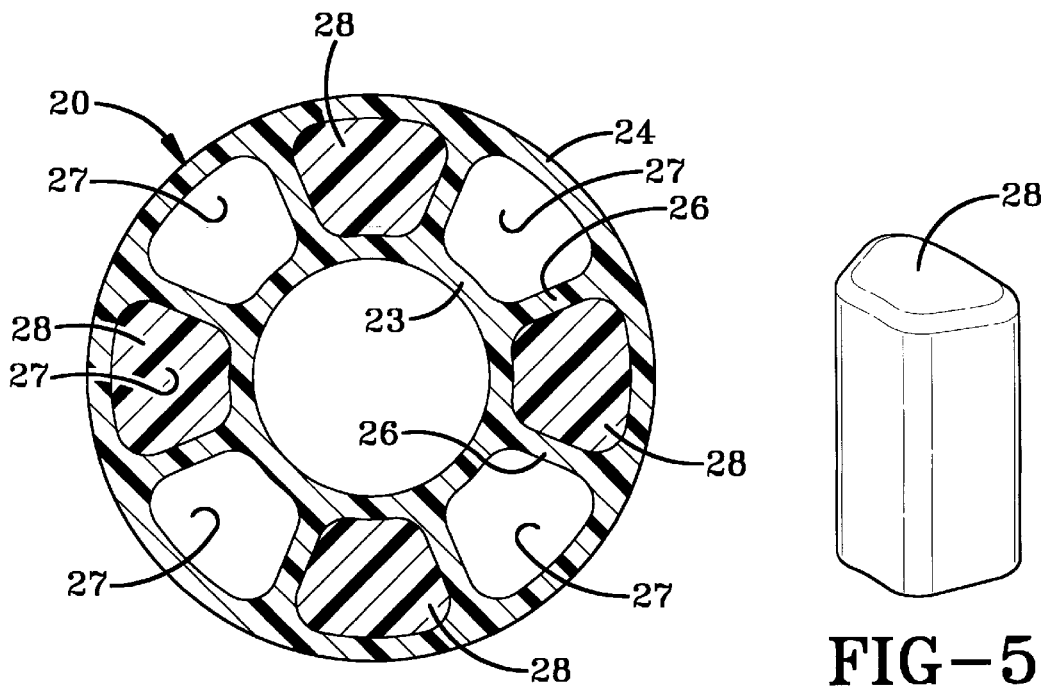
FIG. 4 is a sectional view taken along line 4—4, FIG. 3.
FIG. 5 is a perspective view of one of the elastomeric insert blocks.

In accordance with one of the features of the present invention, bumper 20 additionally includes one or more blocks 28 of an elastomeric material. As is best shown in FIG. 5, blocks 28 are of a size and shape to be slidingly received in compartments 27, although blocks 28 could be received in compartments 27 in other fashions without departing from the spirit of the present invention. Blocks 28 are formed of an appropriate elastomeric material, as will be set forth more fully below.

Plate 12 is secured in a fluid tight clamping relationship with sleeve bead 11 by a threaded clamping stud 32 which extends through an opening 33 formed in base 4 in cooperation with a bumper stud, indicated generally at 34. Bumper stud 34 preferably is formed of a mild steel and may be secured to plate 12 by brazing at 35. The interior of stud 34 has a threaded bore 37 for threaded connection with threaded shaft 38 of clamping stud 32, and together form a central bumper attachment post 36. Other types of attachment posts 36 may be utilized than that shown in the drawings, without effecting the concept of the invention. For example, post 36 could be molded of a high strength plastic integral with a plastic piston member 3, or could be welded or brazed to an inside surface of a metal piston member. Both of these constructions would eliminate an opening being required through the base of piston 3.

Bumper stud 34 is formed with an enlarged outer end 39 which forms an annular undercut 40 adjacent the outwardly tapering annular side wall 41 of post 36. Bumper 20 is formed with a plurality of flexible angled fingers 43 (FIGS. 2 and 3) which extend upwardly inwardly into a hollow interior 44 formed by inner wall 23.

Four flexible fingers 43 that are spaced circumferentially apart by intervening areas terminate in an outer arcuate edge 46 which snaps into and seats in undercut 40. Arcuate edges 46 preferably have arcuate lengths or angles of approximately 75 degrees each, and are inclined inwardly and form an included angle of approximately 20 degrees with inner wall 23. In alternate embodiments (not shown), only one finger 43 exists where such finger is annular.

Post 36 forms a vertically extending member located within the interior 44 of bumper 20 with flexible fingers 43 enabling bumper 20 to be snap-fitted on bumper stud 34 of post 36 by flexing outwardly as it is forced downwardly on post 36. Immediately upon the movement of edges 46 of finger 43 beyond cylindrical side wall portion 47 of enlarged post end 39, the flexibility of fingers 43 enables them to snap into position in undercut 40. When bumper 20 is in position on post 36, annular base 29 will seat upon plate 12, firmly mounting bumper 20 in position within pressure chamber 15. Thus, fingers 43 are secured between undercut 40 and clamp plate 12 and the flexibility of fingers 43 retain the arcuate edges thereof in undercut 40, with the slope surfaces of fingers 43 lying along tapered side wall 41 of end cap 34.

In the preferred embodiment, bumper 20 provides an outer shell formed of a high strength elastomer or plastic such as sold under the trademark CRASTIN, by E.I. Du Pont de Nemours & Company of Wilmington, Del. which is a super tough thermoplastic polyester resin, such as an unreinforced polybutylene terephthalate. The grade of CRASTIN found most suitable has a hardness (Rockwell) of approximately 98 to 120 with a preferred value of 98, a tensile strength in the approximate range of 5,500 to 8,400 psi with a preferred strength of 5,500 psi, and an elongation at break of approximately 50% to 300% with a preferred value of approximately 145%. Bumper 20 is preferably injection molded out of this material and may be configured square, cloverleaf etc., and may be of non-cylindrical shapes without affecting the concept of the invention.

In the preferred embodiment, blocks 28 are formed of a high strength polyester elastomeric or plastic such as sold under the trademark ZYTEL by Du Pont de Nemours & Company which is stronger in compression than bumper 20. The type of ZYTEL found most suitable is formed of a glass reinforced nylon 66 resin having a hardness (Rockwell) in the range of approximately 110 to 122, a tensile strength in the range of approximately 15,000 to 30,000 psi with the preferred value of approximately 27,000 psi, and an elongation at break being in the range of 2% to 4with the preferred value of approximately 3%. Other materials, both reinforced and non-reinforced, may be used without departing from the spirit of the present invention. Thus, the inner members or blocks 28 have a hardness of approximately three times that of bumper 20, with bumper 20 having an elongation of at least twenty-five times that of blocks 28.

As is understood in the relevant art, reinforced glass-filled nylon is stronger than the thermoplastic materials of which bumper 20 is constructed and is able to withstand greater compressive forces than bumper 20. However, such reinforced glass-filled nylon is more brittle than the thermoplastic materials used to construct bumper 20 and has a tendency to crack or otherwise fracture in response to extreme shock loading thereof. In accordance with the features of the present invention, the insertion of blocks 28 into compartments 27 of bumper 20 result in blocks 28 being surrounded by the relatively softer material used to construct bumper 20. The relatively softer material of bumper 20 surrounds and reinforces blocks 28, thus reducing the tendency of blocks 28 to fracture under extreme shock loading. Further in accordance with the features of the present invention, the combination of the relatively stronger but more brittle block 28 and the relatively softer bumper 20 provides the bumper with the characteristics of being able to withstand extreme shock loading without the risk that blocks 28 may crack or otherwise fracture with use.

In the preferred embodiment, four blocks 28 are received within four equally spaced compartments 27 formed in bumper 20. However, bumper 20 can contain between one and eight blocks 28 inside compartments 27, thus providing at least eight different configurations for bumper 20 that can be adapted to suit different loading conditions for air spring 1. It is understood that bumper 20 could contain a greater or fewer number of compartments 27 without departing from the spirit of the present invention, thus providing additional configurations that are available as needed for bumper 20. Further in accordance with the present invention, the shock-absorbing characteristics of bumper 20 also vary with the specific positioning of blocks 28 within compartments 27 such that different shock-absorbing characteristics are achieved if the four blocks depicted in FIG. 4 are all positioned on one side of bumper 20 adjacent one another, with four empty compartments 27 disposed on the other side of bumper 20, which characteristics may be desirable for a specific loading application.

The inclusion of the stiffer blocks 28 in compartments 27 of bumper 20 thus provides a number of different bumper configurations that permit the compressive characteristics of bumper 20 to be specifically tailored to suit a particular loading application for air spring 1. The combined strength and resilience of the different configurations of bumper 20 permit air spring 1 to be used in applications that heretofore were not well suited to the use of existing bumpers in an air spring. The inclusion of blocks 28 in bumper 20 thus provides significant benefits in versatility and utility that were previously unknown in the relevant art.

Accordingly, the improved bumper provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved air spring is constructed and used, the characteristics of the construction, and the advantageous, new and useful results obtained; the new and useful structures, devices, elements, arrangements, parts and combinations, are set forth in the appended claims.

We claim:

1. An air spring having a pair of spaced end members adapted to be mounted at spaced locations and a flexible sleeve formed of an elastomeric material sealingly engaged with the end members and forming a pressurized fluid chamber therebetween, a shock absorbing bumper mounted on one of the end members and extending into the fluid chamber, said bumper being formed of an outer shell of a first plastic material for impact engagement with the other said end member and having at least one inner member formed of a second plastic material mounted within said outer shell and protected from impact engagement with said other end member by the outer shell, and wherein said second plastic material is stronger in compression than said first plastic material.

2. The air spring as defined in claim 1 in which the inner member is a block of reinforced glass-filled nylon.

3. The air spring defined in claim 1 in which the bumper has a generally cylindrical configuration with concentrically mounted spaced inner and outer walls and a plurality of reinforcing ribs extending radially between and connected to said spaced walls forming a plurality of compartments between adjacent pairs of said reinforcing ribs and said inner and outer walls; and in which the inner member is located within at least one of said compartments.

4. The air spring defined in claim 3 in which an annular end wall extends between the inner and outer walls of the bumper.

5. The air spring defined in claim 4 in which the annular end wall is dome shaped.

6. The air spring as defined in claim 3 wherein the bumper is formed with eight of said compartments, four of said compartments each containing one of said inner plastic members.

7. The air spring defined in claim 6 in which the inner plastic members are equally spaced circumferentially within said bumper.

8. The air spring defined in claim 1 in which the outer shell of the bumper has a Durometer hardness (Rockwell) with an approximate range of 98 to 120.

9. The air spring defined in claim 8 in which the outer shell has a hardness (Rockwell) of approximately 98.

10. The air spring defined in claim 1 in which the outer shell of the bumper has an elongation at break with a range of approximately 50% to 300%.

11. The air spring defined in claim 10 in which the outer shell has an elongation at break of approximately 145%.

12. The air spring defined in claim 1 in which the outer shell of the bumper has tensile strength in a range of approximately 5,500 to 8,400 psi.

13. The air spring defined in claim 12 in which the outer shell has tensile strength of approximately 5,500 psi.

14. The air spring defined in claim 1 in which the inner member is formed of a glass reinforced nylon 66 resin.

15. The air spring defined in claim 1 in which the second plastic material of the inner member has a hardness (Rockwell) in a range of approximately 110 to 122.

16. The air spring defined in claim 1 in which the second plastic material has a tensile strength in the range of approximately 15,000 to 30,000 psi.

17. The air spring defined in claim 16 in which the second plastic material has a tensile strength of approximately 27,000 psi.

18. The air spring defined in claim 1 in which the second plastic material has an elongation at break in a range of approximately 2% to 4%.

19. The air spring defined in claim 18 in which the second plastic material has an elongation at break of approximately 3%.

20. An air spring having a pair of spaced end members adapted to be mounted at spaced locations and a flexible sleeve formed of an elastomeric material mounted between said end members and forming a pressurized fluid chamber therebetween, a shock absorbing bumper mounted on one of the end members and extending into the fluid chamber, said bumper being formed of an outer shell of a first plastic material for impact engagement with the other said end member and an inner member formed of a second plastic material mounted within said outer shell and protected from impact engagement with said other end member by the outer shell, wherein said inner member has a higher tensile strength and higher hardness and a smaller elongation than said outer shell.

21. The air spring defined in claim 20 in which the outer shell of the bumper has a Durometer hardness (Rockwell) with an approximate range of 98 to 120.

22. The air spring defined in claim 20 in which the outer shell of the bumper has an elongation at break with a range of approximately 50% to 300%.

23. The air spring defined in claim 20 in which the outer shell of the bumper has tensile strength in a range of approximately 5,500 to 8,400 psi.

24. The air spring defined in claim 20 in which the second plastic material of the inner member has a hardness (Rockwell) in a range of approximately 110 to 122.

25. The air spring defined in claim 20 in which the second plastic material has a tensile strength in the range of approximately 15,000 to 30,000 psi.

26. The air spring defined in claim 20 in which the second plastic material has an elongation at break in a range of approximately 2% to 4%.

27. The air spring defined in claim 20 in which the inner member has a hardness approximately three times the hardness of the outer shell.

28. The air spring defined in claim 20 in which the outer shell has an elongation at least twenty-five times greater than the elongation of the inner member.

* * * * *